US006529689B1

(12) United States Patent
Oshima

(10) Patent No.: US 6,529,689 B1
(45) Date of Patent: Mar. 4, 2003

(54) PREVENTIVE DEVICE OF HARMFUL LIGHT LEAKAGE OF LENS ASSEMBLY AREA OF DIGITAL STILL CAMERA

(75) Inventor: Shigeru Oshima, Chofu (JP)

(73) Assignee: ARC Design, Inc., Tokyo (JP)

( * ) Notice: Subject to any disclaimer, the term of this patent is extended or adjusted under 35 U.S.C. 154(b) by 0 days.

(21) Appl. No.: 09/880,320

(22) Filed: Jun. 13, 2001

(30) Foreign Application Priority Data

Jun. 6, 2001 (CN) .......................................... 90113712 A

(51) Int. Cl.[7] .............................................. G03B 17/02
(52) U.S. Cl. ..................................................... 396/535
(58) Field of Search ......................... 396/535; 359/507, 359/513, 819, 600, 601, 611–615, 823

(56) References Cited

U.S. PATENT DOCUMENTS 6,362,921 B1 * 3/2002 Iida ............................. 359/627

FOREIGN PATENT DOCUMENTS

| JP | 6-222422 | * | 8/1994 |
| JP | 11-305286 | * | 11/1999 |

* cited by examiner

*Primary Examiner*—D. Rutledge
(74) *Attorney, Agent, or Firm*—Senniger, Powers, Leavitt & Roedel

(57) ABSTRACT

A device used in a digital still camera with its lens assembly to prevent the sensor like CCD or C-MOS from receiving harmful light which comes into a sensor area along the periphery of a lens barrel.

4 Claims, 2 Drawing Sheets

PREVENTIVE DEVICE OF HARMFUL LIGHT LEAKAGE OF LENS ASSEMBLY AREA OF DIGITAL STILL CAMERA

BACKGROUND OF THE INVENTION

1. Field of the Invention

The invention relates to a device to protect the image sensor area of a digital still camera from harmful light leakage, which mainly comes through the gap between the camera front and the periphery-surface of the lens barrel, using a simple one-piece part made of black elastic materials such as rubber or elastic plastic.

2. Background Art

The lens of a conventional type of still cameras like 35 mm format has a light leakage prevention means, which is usually made of black fluffy cloth and placed around the rim-edge of the hole, through which the lens moves in and out of the camera front cover, and the periphery-surface of the lens barrel touches the light leakage prevention means while the lens is moving in and out, so that the light cannot come into the film area through the gap between the lens barrel and the front cover rim-edge.

Specifically, for example, FIG. 1 shows the light leakage prevention means, of a conventional still camera of 35 mm format, fixed around the rim-edge of the hole provided on a camera front cover (13), through which lens moves in and out (as shown by arrows) of the camera front cover (13). The light leakage prevention means (11) is made of black fluffy cloth, and fixed on the rim-edge of the hole (12) of the camera front cover (13). The camera front cover (13) covers the front area of an inner camera assembly including a lens barrel (14), and the lens barrel (14) comes out of the front cover (13) through the hole (12) provided on the camera front cover (13) over the lens front, and the lens barrel (14) moves in and out through the hole (12) having practically no gap between the periphery-surface (15) of a lens barrel and the light leakage prevention means (11). While the lens barrel, (14) is moving in and out, the black fluffy cloth of the light leakage prevention means (11) keeps close contact with the periphery-surface (15) of the lens barrel so that no light can come in through the gap between the periphery-surface (15) of the lens barrel and the light leakage prevention means (11).

Such kind of light leakage prevention means, as theretofore mentioned, can be arranged to conventional still cameras, because the lens barrel assembly is driven with sufficiently strong force to override the friction between the lens barrel and the light leakage prevention means (11).

On the contrary, in the case of digital still cameras, lenses are far much smaller and lighter in size and weight than ordinary still camera lenses, and furthermore, the stroke (moving distance) of focusing is extremely short. Consequently, the lens must be driven with very small amount of force and very delicately in comparison with ordinary still cameras. So, if such light leakage prevention means made of black fluffy cloth as the one used in ordinary still cameras is provided for digital still camera lenses, the lens cannot move smoothly because of being overcome by the friction between the periphery-surface of the lens barrel and the light leakage prevention means. For the digital still camera lenses, it is necessary to have some other means of light leakage prevention without having anything that generates strong resistance between the lens barrel and its holder.

SUMMARY OF THE INVENTION

In this invention a simple one-piece part is provided to prevent the image sensor area of a digital still camera from receiving harmful light leakage coming into the image sensor area, and to get the image sensor to receive only the light coming through the rearmost element of the lens as described hereinafter.

A lens is usually assembled on a lens assembly base, where the supporting means of a lens barrel is fixed. A light leakage prevention device is formed as a one-piece part and is made of certain black color and light-shielding elastic materials such as rubber or elastic plastic. The upper circle rim-edge of the light leakage prevention device is fixed over the bottom circle rim-edge of the lens barrel. The lower circle rim-edge of the light leakage prevention device is fixed light-tightly on the lens assembly base, where the image sensor is placed underneath of the rearmost element of the lens. Thanks to the elasticity of the material of the light leakage prevention device, the lens can move easily back and forth even though the upper circle rim-edge of the light leakage prevention device is connected to the lens bottom circle rim-edge, and the lower circle rim-edge of the light leakage prevention device is fixed on the lens assembly base. Also thanks to the light-shielding material of the light leakage prevention device, light cannot come through the light leakage prevention device. In other words, the bottom of the lens barrel, together with the light leakage prevention device, cover the entire area of an image sensor, and only the light coming through the rearmost element of the lens can reach the image sensor, keeping a free movement of the lens back and forth.

By using this simple one-piece part made of elastic and light-shielding materials, like black rubber or black elastic plastic, it is possible easily to prevent the digital camera image sensor area from receiving any harmful light, except the light coming through the rearmost element of the lens.

DETAILED DESCRIPTION OF THE INVENTION

Figure 1:
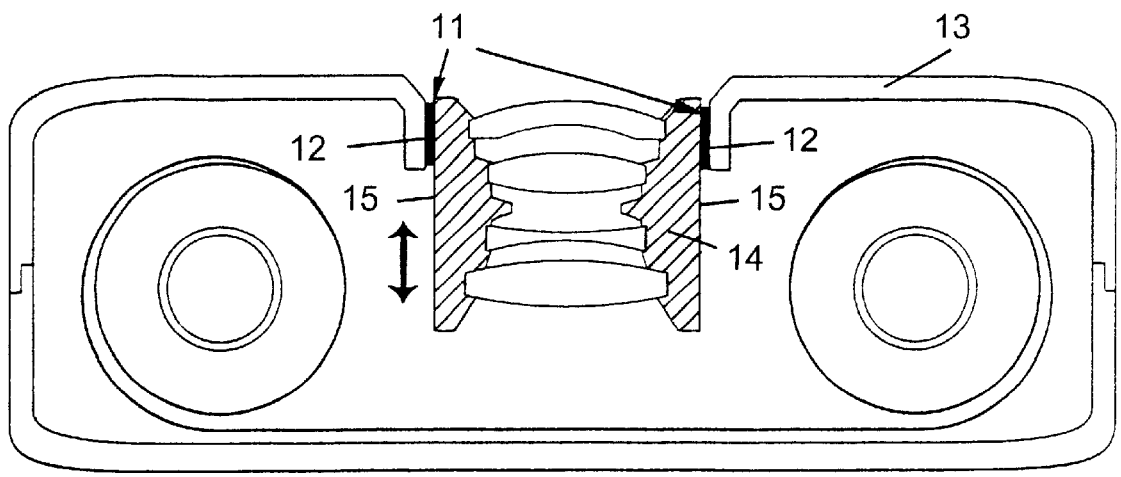
FIG. 1 is a cross-sectional view of the conventional and typical light leakage prevention means that is used generally for conventional still cameras like 135 format cameras.
Figure 2:
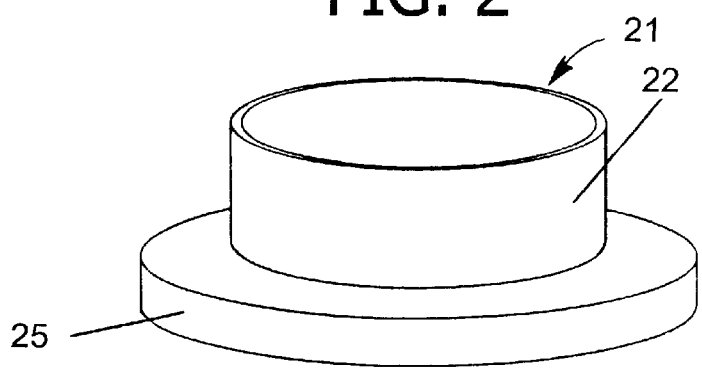
FIG. 2 is a perspective view of the light leakage prevention device for digital still cameras of this invention.

FIG. 2 shows a one-piece light leakage prevention device (21) according to this invention that comprises only one-piece part made of elastic and light shielding materials like black rubber or elastic plastic.

Figure 3:
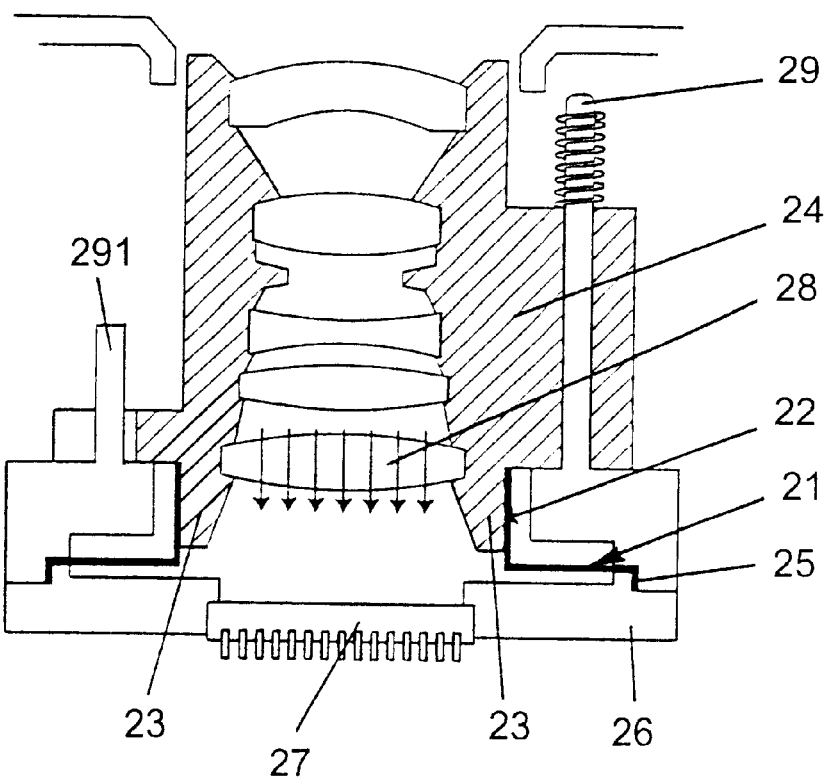
FIG. 3 is a cross-sectional view of the light leakage prevention device for digital still cameras of this invention that is assembled in the lens assembly.

FIG. 3 is a sectional-view of the light leakage prevention device (21) assembled in a lens assembly. The upper circle rim-edge (22) of the light leakage prevention device (21) is fixed light-tightly over a lens bottom circle rim-edge (23) of a lens barrel (24) which is supported by a guide rail (29) and a supporting pin (291). A lower circle rim-edge (25) of the light leakage prevention device (21) is fixed light-tightly to a lens assembly base (26), where an image sensor (27) is placed underneath a rearmost element (28) of a lens disposed within the lens barrel (24).

The light coming through the rearmost element (28) of the lens as shown by arrows can reach the image sensor (27), but all other light coming through lens barrel periphery area cannot go through the light leakage prevention device (21), and the image sensor (27) can be protected safely from any harmful light other than the light coming through the rearmost element (28) of the lens.

Figure 4:
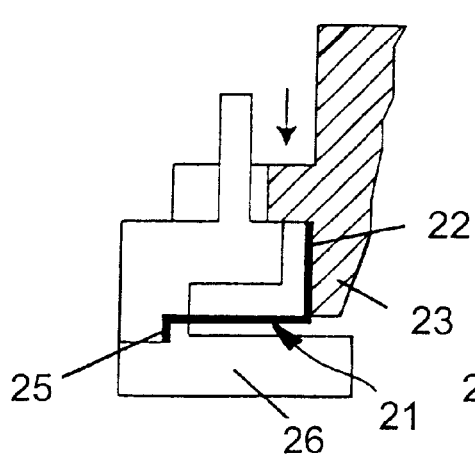
FIG. 4 is a partial cross-sectional view of the light leakage prevention device for digital still cameras of this invention that is assembled in the lens assembly, and shows the status of the lens being moved toward (down) the sensor, where the light prevention device is depressed toward the sensor.
Figure 5:
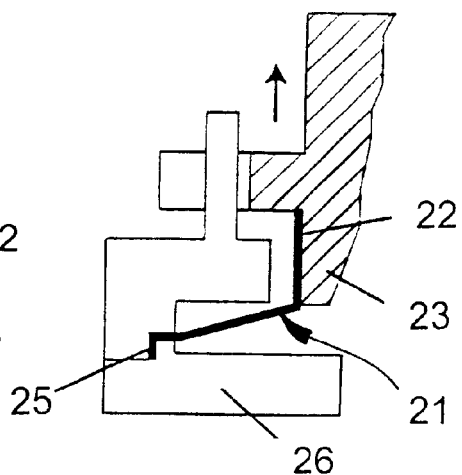
FIG. 5 is a partial cross-sectional view of the light leakage prevention device for digital still cameras of this invention that is assembled in the lens assembly, and shows the status of the lens being moved away (up) from the sensor, where the light prevention device is pulled away from the sensor.

Also thanks to the elasticity of the material of the light leakage prevention device (21), and being supported by the guide rail (29) and supporting pin (291), the lens barrel (24) can move easily back and forth even though the upper circle rim-edge (22) of the light leakage prevention device (21) is fixed to the lens bottom circle rim-edge (23), and the lower circle rim-edge (25) of the light leakage prevention device (21) is fixed on the lens assembly base (26). FIG. 4 shows the status of the lens moved toward (down) the sensor, where the light prevention device (21) is depressed toward the sensor (27). FIG. 5 shows the status of the lens moved away (up) from the sensor (27), where the light prevention device (21) is pulled away from the sensor (27).

What is claimed is:

1. A light leakage prevention device for digital still cameras comprising a one-piece part made of elastic and light-shielding materials having an upper circle opening and a lower circle opening, wherein a rim-edge of the upper circle opening is fixed to a bottom rim-edge of a lens barrel, and a rim-edge of the lower circle opening is fixed to a lens assembly base, and wherein the light leakage prevention device is fixed between the bottom part of a lens disposed within the lens barrel and the lens assembly base so as to entirely shut the light reaching to an image sensor placed underneath the lens.

2. The light leakage prevention device for digital still cameras as claimed in claim 1, wherein the one-piece part is made of black rubber.

3. The light leakage prevention device for digital still cameras as claimed in claim 1, wherein the one-piece part is made of elastic plastic.

4. The light leakage prevention device for digital still cameras as claimed in claim 1, wherein the image sensor is placed underneath a rearmost element of the lens.

* * * * *